(12) United States Patent
Klein et al.

(10) Patent No.: US 11,434,769 B2
(45) Date of Patent: Sep. 6, 2022

(54) IMPACT-COOLING TUBULAR INSERT FOR A TURBOMACHINE DISTRIBUTOR

(71) Applicants: SAFRAN AIRCRAFT EGINES, Paris (FR); SAFRAN HELICOPTER ENGINES, Bordes (FR)

(72) Inventors: Guillaume Klein, Moissy-Cramayel (FR); Matthieu Jean Luc Vollebregt, Moissy-Cramayel (FR); Thomas Joseph Lardellier, Moissy-Cramayel (FR); Guillaume Carrerot, Moissy-Cramayel (FR); Stephane Lavignotte, Moissy-Cramayel (FR)

(73) Assignees: SAFRAN AIRCRAFT ENGINES, Paris (FR); SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 17/429,474

(22) PCT Filed: Mar. 16, 2020

(86) PCT No.: PCT/FR2020/050548
§ 371 (c)(1),
(2) Date: Aug. 9, 2021

(87) PCT Pub. No.: WO2020/188212
PCT Pub. Date: Sep. 24, 2020

(65) Prior Publication Data
US 2022/0049610 A1    Feb. 17, 2022

(30) Foreign Application Priority Data
Mar. 20, 2019 (FR) ..................... 1902874

(51) Int. Cl.
*F01D 5/18* (2006.01)
*F01D 5/14* (2006.01)
*B33Y 80/00* (2015.01)

(52) U.S. Cl.
CPC ............. *F01D 5/189* (2013.01); *F01D 5/147* (2013.01); *B33Y 80/00* (2014.12);
(Continued)

(58) Field of Classification Search
None
See application file for complete search history.

(56) References Cited

U.S. PATENT DOCUMENTS

| 6,457,935 B1 * | 10/2002 | Antunes ................ F01D 11/006 |
| | | 416/193 A |
| 8,021,118 B2 * | 9/2011 | Bergander ............. F01D 25/12 |
| | | 416/193 A |

(Continued)

FOREIGN PATENT DOCUMENTS

| EP | 1508670 A2 | 2/2005 |
| EP | 1847687 A1 | 10/2007 |

(Continued)

OTHER PUBLICATIONS

International Search Report received for PCT Patent Application No. PCT/FR2020/050548, dated Jun. 26, 2020, 7 pages (2 pages of English Translation and 5 pages of Original Document).

*Primary Examiner* — Michael Lebentritt
(74) *Attorney, Agent, or Firm* — Womble Bond Dickinson (US) LLP

(57) ABSTRACT

A tubular ventilation sleeve for a turbomachine distributor, in particular for an aircraft, the sleeve having a generally elongate shape along an axis (A-A) and including a perforated tubular wall around said axis, one of the axial ends of the sleeve being open and the other being closed by a bottom wall, wherein it further includes support beams when the sleeve is made by additive manufacturing, the beams extending inside the sleeve between the tubular wall and the (Continued)

bottom wall and having a longitudinal cross-section with a generally triangular shape, two sides of which are respectively connected to the tubular wall and the bottom wall and the last side of which is free and extends inside the sleeve, perforations in the tubular wall being provided between the support beams.

10 Claims, 4 Drawing Sheets

(52) U.S. Cl.
CPC .... *F05D 2220/323* (2013.01); *F05D 2230/31* (2013.01); *F05D 2250/11* (2013.01); *F05D 2250/121* (2013.01); *F05D 2250/191* (2013.01); *F05D 2260/201* (2013.01); *F05D 2260/232* (2013.01); *F05D 2260/608* (2013.01)

(56) References Cited

U.S. PATENT DOCUMENTS

| | | | |
|---|---|---|---|
| 8,734,111 B2* | 5/2014 | Lomas | F01D 5/187 416/193 A |
| 9,863,263 B2* | 1/2018 | Berche | F01D 11/008 |
| 10,030,523 B2* | 7/2018 | Quach | F01D 5/18 |
| 10,066,488 B2* | 9/2018 | Myers | F01D 5/147 |
| 10,669,886 B2* | 6/2020 | Lehmann | F23R 3/002 |
| 2004/0265129 A1* | 12/2004 | Pabion | F01D 5/189 416/97 R |
| 2007/0231150 A1 | 10/2007 | Dervaux et al. | |
| 2010/0129196 A1 | 5/2010 | Johnston et al. | |
| 2013/0051980 A1* | 2/2013 | Grohens | F01D 17/085 415/115 |
| 2016/0333735 A1* | 11/2016 | Bunker | F01D 5/189 |
| 2017/0067363 A1 | 3/2017 | Lacy et al. | |
| 2018/0216476 A1* | 8/2018 | Pardo | F01D 9/041 |
| 2018/0371920 A1 | 12/2018 | Packer et al. | |

FOREIGN PATENT DOCUMENTS

| | | |
|---|---|---|
| EP | 3382150 A1 | 10/2018 |
| FR | 2094033 A1 | 2/1972 |
| FR | 2872541 A1 | 1/2006 |
| FR | 2899271 A1 | 10/2007 |
| FR | 2976616 A1 | 12/2012 |

\* cited by examiner

Fig.5
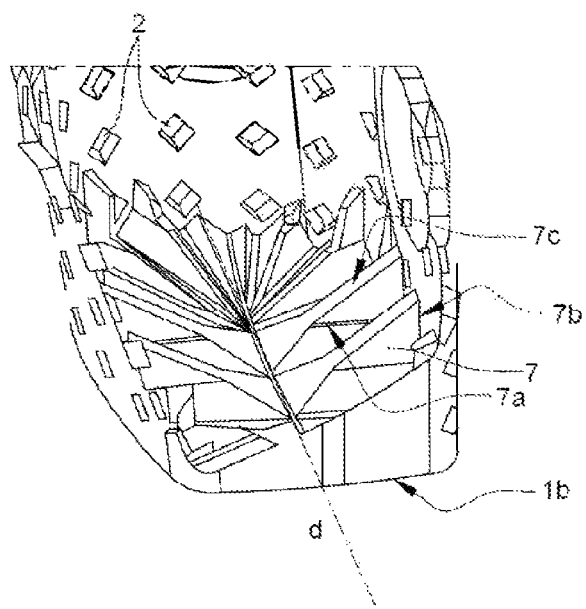
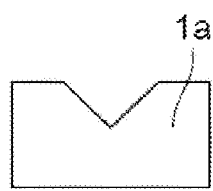
Fig. 6a
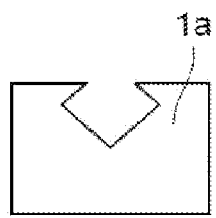
Fig. 6b
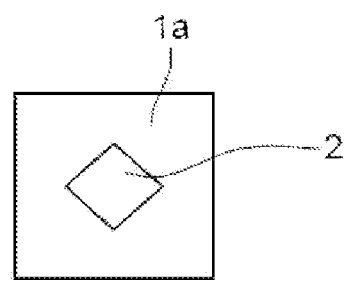
Fig. 6c

IMPACT-COOLING TUBULAR INSERT FOR A TURBOMACHINE DISTRIBUTOR

TECHNICAL FIELD OF THE INVENTION

The present invention relates to the field of the turbomachines, in particular the gas turbine engines, and is aimed more particularly at the turbine distributors and their ventilation.

BACKGROUND

In a gas turbine engine, the incoming air is compressed in at least one compressor before being mixed with a fuel and burned in a combustion chamber. The hot gases produced in the chamber drive the downstream turbine or the downstream turbines and are then ejected into a nozzle. The different turbine stages comprise rotor bladed wheels and stator distributors. Each distributor comprises two annular platforms, internal and external respectively, between which extend substantially radial blades. Due to the temperature of the gases flowing through the turbine, the blades of the distributors are subjected to very severe operating conditions. The blades of the distributors must therefore be cooled to maintain an acceptable service life.

In the present technique, a distributor blade is tubular and comprises an internal cavity in which a multi-perforated tubular sleeve is mounted.

Such sleeves are, for example, described in the documents FR-A1-2 899 271, FR-A1-2 872 541, FR-A1-2 976 616, EP-A1-1 847 687, US-A1-2018/371920, US-A1-2010/129196 and US-A1-2017/067363.

According to one example of embodiment, the two platforms and the blade form a single foundry piece. According to another example of embodiment, the two platforms and the blade form a part obtained by brazing two foundry single-blades. The sleeve is manufactured by sheet metal forming and is configured to be held within the internal cavity of the blade, spaced from the walls of the blade to allow both the impact of the air streams on the wall and the flow of air through the space thus provided. An opening in the outer platform supplies the sleeve with cooling air from the compressor, for example.

Some of this air passes through orifices provided in walls of the sleeve and cools the wall of the blade by impact. This air then flows downstream where it is discharged into the gas duct through perforations provided along the wall of the trailing edge of the blade. It should be noted that the internal face of the wall of the blade may eventually be provided with flow disrupting elements that promote the heat exchange between the air flowing in the cavity and the wall. During assembly, the previously shaped sleeve is slid into the cavity of the blade through the opening provided in the outer platform. The sleeve is then made integral with the blade by welding or brazing along its edge in contact with the wall of the opening provided in the outer platform. The opposite part of the sleeve is guided through the opening provided in the inner platform of the blade which forms a slideway to allow relative movement between the blade and the sleeve. These longitudinal displacements are due to temperature variations during the operation of the turbomachine and to the fact that the two parts differ in the nature of the materials of which they are made and in their manufacturing method.

A particular embodiment of the sleeve inside the cavity is described in the patent in the name of the Applicant, EP-A1-1 508 670.

In the prior art, the manufacturing method of such a sleeve requires several steps, namely a step for bending a metal sheet, a step for welding the metal sheet to form a tube and a step for machining the tube by electro erosion (EDM for "Electrical Discharge Machining") to perforate it. However, this method is time-consuming and costly.

An aim of the present invention is to remedy this disadvantage by providing a ventilation sleeve configured to allow its manufacture by a fast and economical method, for example by additive manufacturing.

SUMMARY OF THE INVENTION

To this end, the invention relates to a tubular ventilation sleeve for a turbomachine distributor, in particular for an aircraft, the sleeve having a generally elongated shape along an axis and comprising a tubular wall perforated around this axis, one of the axial ends of the sleeve being open and the other being closed by a bottom wall, characterized in that it furthermore comprises support beams when the sleeve is made by additive manufacturing, these beams extending inside the sleeve, between the tubular wall and the bottom wall and having a longitudinal cross-section with a generally triangular shape, two sides of which are respectively connected to the tubular wall and to the bottom wall, and the last side of which is free and extends inside the sleeve, perforations in the tubular wall being provided between the support beams.

Such a sleeve according to the invention thus has arrangements that allow it to be designed by additive manufacturing, which is a fast and economical method. Indeed, the beams that extend inside the bottom wall reinforce this bottom wall and avoid its collapse during additive manufacturing (in other words, the bottom does not have a flat and therefore cantilevered shape, which cannot be manufactured by a powder bed additive manufacturing method without requiring support means). The sleeve according to the invention is thus particularly suitable to be manufactured by additive manufacturing. Without these beams, the sleeve according to the invention would not be possible by this method.

Preferably, each beam has, at the level of its side connected to the bottom wall, a greater thickness of material than the rest of the beam.

Advantageously, the beams cover substantially the entire internal surface of the bottom wall.

Thus, the beams support and stiffen the bottom wall allowing thus the design of the sleeve by additive manufacturing.

Preferably, the beams are separated into two series which extend respectively on either side of a straight line extending in the bottom wall, each beam having an end partly located at the level of this straight line.

Advantageously, the tubular wall comprises perforations of polygonal shape, for example square or diamond-shaped.

Advantageously, the perforations are substantially identical and are positioned so that one of their vertices is oriented on the side of the bottom wall.

Thus, the shape and positioning of the perforations enables to design them by additive manufacturing.

Advantageously, the bottom wall comprises, outside the sleeve, grooves for partial recessing of the beams.

Thus, the total mass of the sleeve is reduced.

The present invention also relates to a turbine distributor for an aircraft turbomachine, comprising internal and external platforms connected together by tubular blades in which are mounted sleeves comprising any one of the aforementioned characteristics, as well as an aircraft turbomachine comprising a turbine distributor according to the invention.

The present invention also relates to a method for making a tubular ventilation sleeve for a turbomachine distributor according to the invention, comprising the additive manufacturing of this sleeve on a support, starting by making the open end and ending with the closed end of the sleeve.

BRIEF DESCRIPTION OF FIGURES

The invention will be better understood and other details, characteristics and advantages of the present invention will become clearer from the following description made by way of non-limiting example and with reference to the attached drawings, in which:

FIG. 5 is a perspective detail view with partial pull-out illustrating the internal surface of the bottom wall of the ventilation sleeve according to the invention;

FIGS. 6a to 6c schematically illustrate successive steps in the design by additive manufacturing of a portion of the ventilation sleeve according to the invention;

DETAILED DESCRIPTION OF THE INVENTION

By convention, in this application, the term "downstream" is defined with respect to the direction of gas flow in an operating turbomachine. Also, by convention in the present application, the terms "internal" and "external" are defined axially with respect to the longitudinal axis of the sleeve, and the terms "inner" and "outer" are defined radially with respect to a longitudinal axis of the turbomachine.

Figure 1:
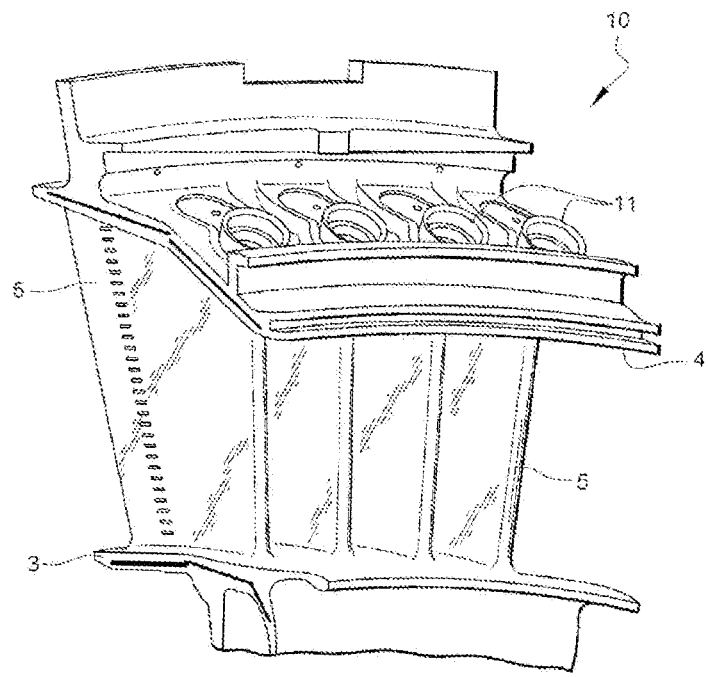
FIG. 1 is a schematic perspective view of a distributor sector of the prior art.

In FIG. 1, the reference 10 designates a turbine distributor of a turbomachine such as an aircraft turbojet engine or a turboprop engine, this distributor 10 comprising coaxial annular platforms, respectively internal 3 and external 4, which delimit between them the annular flow duct of the gases in the turbine and between which extend radially blades 5.

Figure 2:
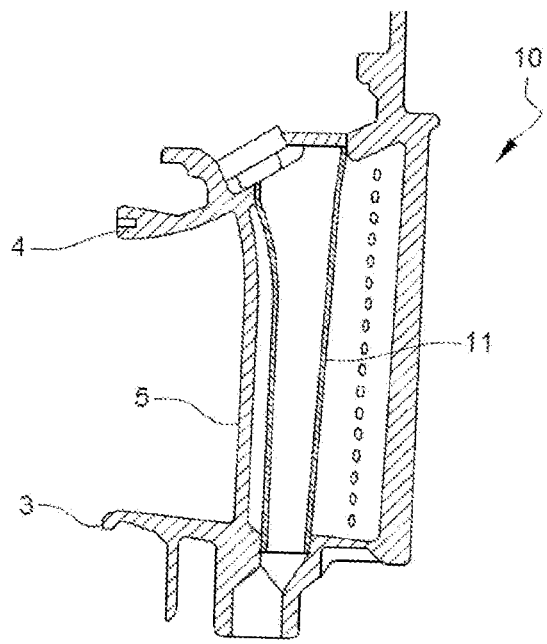
FIG. 2 is a cross-sectional view of a distributor blade according to the prior art.

FIG. 2 illustrates a cross-sectional view of a blade 5 of a distributor 10 provided with a ventilation sleeve 11 according to the prior art. The blade 5 of the distributor 10 comprises an internal cavity in which is mounted a perforated tubular sleeve 11 for the circulation of ventilation air from a supply enclosure, radially external to the external platform 4 of the distributor. This air passes in part through perforations of the sleeve 11, impacts the internal wall of the blade 5 for its cooling, and is then discharged into the gas flow duct of the turbine. The ventilation air is taken upstream from a compressor of the turbomachine and is brought into the supply enclosure via conducts not shown. The radially external end of the sleeve 11 is open for its air supply and its radially internal end may be open, as in FIG. 2. In the invention, however, it is closed.

Figure 3:
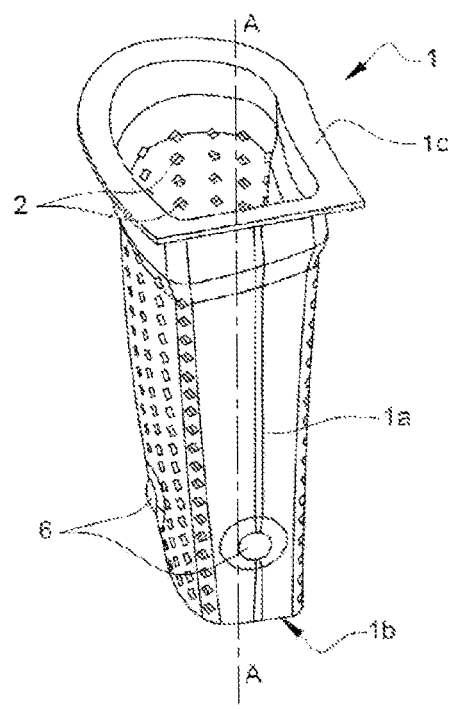
FIG. 3 is a perspective view illustrating a ventilation sleeve according to the invention.

According to the example of embodiment shown in FIG. 3, the tubular ventilation sleeve 1 has a generally elongated shape along a longitudinal axis A-A. This sleeve comprises a peripheral tubular wall 1a around this longitudinal axis A-A provided with a plurality of perforations 2. One of the axial ends of the sleeve is open while the other is closed by a bottom wall 1b, (thus in contrast to the sleeve 11 of the prior art shown in FIG. 2).

The sleeve 1 is intended to equip a turbomachine distributor 10, in particular of aircraft. The sleeve 1 according to the invention is accommodated, in a manner known per se, in a cavity of one of the blades 5 of the distributor 10.

When mounted, the sleeve 1 is configured to be slid into the cavity of the blade through the opening provided in the outer platform 4.

In particular, the sleeve 1 comprises protruding bosses 6 on the external surface of its peripheral tubular wall (FIG. 3). These bosses, formed in a manner known per se, for example by stamping, are arranged in the vicinity of the closed axial end of the sleeve 1 and hold the sleeve at a distance from the walls of the blade to allow both the impact of the air streams on the wall and the circulation of air in the space thus provided.

The sleeve 1 is then made integral with the blade by welding or brazing along its edge in contact with the wall of the opening provided in the outer platform 4. The open axial end of the sleeve 1 is advantageously provided with a collar 1c allowing the sleeve and the blade to be joined together.

In a manner known per se, an opening provided in the outer platform 4 supplies the sleeve 1 with cooling air, for example from the compressor. This cooling air passes through the perforations 2 of the sleeve and cools the wall of the blade by impact. Since the sleeve 1 has a radially internal end closed by the bottom wall 1b, all of the cooling air flowing into the sleeve 1 through the perforations 2 then flows downstream where it is discharged into the gas duct through perforations provided along the wall of the trailing edge of the blade.

According to the invention, the sleeve 1 further comprises support beams 7 extending inside the sleeve, between the peripheral tubular wall 1a and the bottom wall 1b. Perforations 2 of the tubular wall 1a of the sleeve 1 are provided between the support beams 7.

Figure 4:
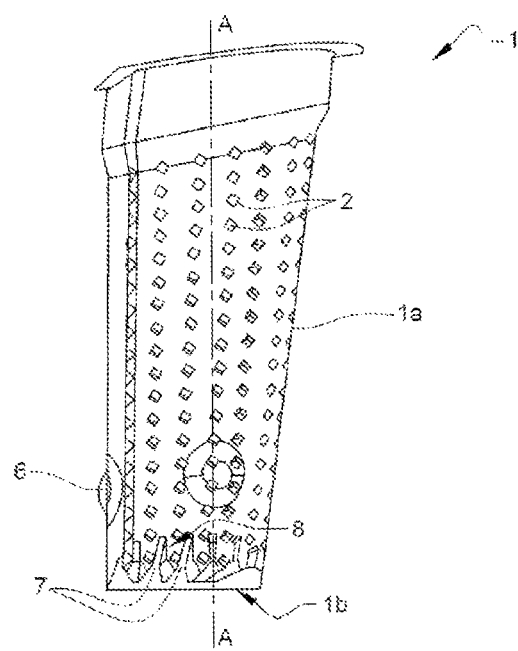
FIG. 4 is a longitudinal cross-sectional view of an example of an embodiment of the ventilation sleeve according to the invention.

With reference to FIGS. 4 and 5, each beam 7 has a generally triangular longitudinal section. A first side 7a, said horizontal side, of the beams 7 is connected to the bottom wall 1b of the sleeve 1, a second side 7b, said vertical side, of the beams 7 is connected to the tubular wall 1a of the sleeve 1, and a third side 7c, said oblique side, is free and extends inside the sleeve 1. Thus, during the additive manufacturing of the sleeve, the bottom wall 1b will be stiffened and supported by the beams 7, allowing the design of the sleeve 1. Indeed, due to the presence of the beams 7, the bottom wall 1b of the sleeve 1 does not have a flat shape (without unevenness of levels) but comprises a succession of crenellations forming a substantially saw-tooth-like relief facilitating and simplifying the construction of the sleeve 1 by additive manufacturing on powder bed. Indeed, this shape of the bottom wall 1b of the sleeve 1 due to the presence of the beams 7 allows to dispense with the use of support elements during the manufacture of the bottom wall 1b.

Indeed, this triangular shape of the beams 7 corresponds to draft angles on the free sides of the beams 7 extending inside the sleeve of at least 30° and, preferably, of the order of 45°, guaranteeing the manufacture and the superimposition of the successive layers by additive manufacturing, each manufactured layer allowing to support the following layer during the manufacturing.

Advantageously, in portions of the tubular wall 1a to which beams 7 are connected by one of their sides, the thickness of the tubular wall 1a is locally greater than in a remaining portion of the tubular wall 1a, and in particular in the portions of the tubular wall 1a located between two adjacent beams 7, also called inter-beam spaces 8. Thus, as the perforations 2 are provided between two adjacent beams 7 (in an inter-beam space 8), a length of the perforations 2 is optimal for ensuring the cooling of the blade. In addition, these inter-beam spaces allow to reduce the total mass of the sleeve 1.

Each beam 7 has, at the level of its side connected to the bottom wall 1b, a thickness of material greater than the rest of the beam and all the beams 7 advantageously cover substantially the entire internal surface of the bottom wall 1b. The beams 7 are separated into two series which extend respectively on either side of a straight line d extending into the bottom wall 1b, each beam having an end partly located at the level of this straight line.

Advantageously, the perforations 2 are polygonal in shape, for example square or diamond-shaped. The perforations 2 are substantially identical and are positioned so that one of their vertices is oriented on the side of the bottom wall. Thus, the shape and the positioning of the perforations 2 enables to design them by additive manufacturing, each manufactured layer allowing to support the following layer during successive steps of the additive manufacturing, as detailed hereafter, with reference to FIGS. 6a, 6b and 6c.

The dimensions of the perforations 2 are determined in such a way as to ensure an optimum cooling of the blade.

Figure 7:
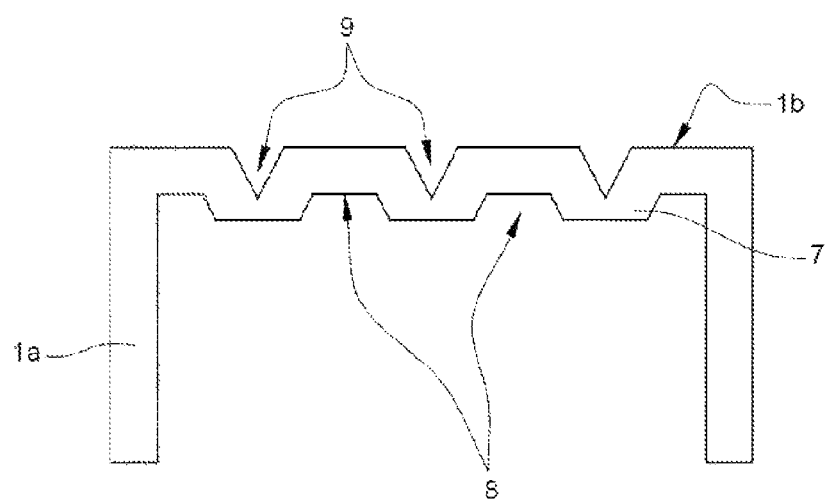
FIG. 7 is a schematic partial cross-sectional view of an example of an embodiment of the bottom wall of the ventilation sleeve according to the invention.

Advantageously, as shown in FIG. 7, grooves 9 are provided in the external surface of the bottom wall 1b, facing the sides of the beams 7 connected to the bottom wall 1b. The longitudinal axis of the grooves 9 is substantially parallel to the longitudinal axis of the sides of the beams 7 connected to the bottom wall 1b. These grooves 9 recess partially the beams 7 and have the function of lightening the sleeve 1. This further reduces the total mass of the ventilation sleeve.

The present invention also relates to a turbine distributor for an aircraft turbomachine, comprising internal 12 and external 14 platforms connected together by tubular blades in which sleeves 1 according to the invention are mounted, and an aircraft turbomachine comprising a turbine distributor according to the invention.

The present invention also relates to a method for making a tubular ventilation sleeve 1 for a turbomachine distributor according to the invention, by additive manufacturing of this sleeve on a support, starting by making the open end and ending with the closed end of the sleeve 1.

According to the method of the invention, base material for forming the sleeve 1 is deposited on a support. This base material is, for example, in the form of a liquid, powder, tape or yarn, so that it forms a layer. The base material is shaped in a manner known per se, for example by laser sintering. Then base material is again deposited on this first layer to be shaped, and so on, so that several successive layers of material are made on top of each other.

As a first step, the base material is shaped so as to constitute a first layer shaped like a solid truncated annular comma with a first thickness forming a constituent layer of the collar 1c of the sleeve 1. The collar 1c is entirely formed after a succession of a first plurality of shaped material layers shaped like a truncated annular comma with a first thickness.

Then, the base material is shaped so as to constitute a new layer shaped like a truncated annular comma with a second thickness less than the first thickness of the collar 1c, this new layer forming a constituent layer of the peripheral tubular wall 1a of the sleeve 1. The peripheral tubular wall 1a is fully formed after a succession of a second plurality of shaped material layers shaped like a truncated annular comma with a second thickness. The number of layers for making the peripheral tubular wall 1a is therefore greater than the number of layers allowing to make the collar 1c.

FIGS. 6a, 6b, 6c schematically illustrate successive steps in the manufacture of the peripheral tubular wall 1a at the level of a perforation 2.

The shape and the positioning of the perforations are such that each manufactured layer allows to support the next layer in successive steps. This is because the shaping of the base material in successive layers first creates a V-shaped opening starting from the tip shaped like a V, with the material not being shaped between the two legs of the V (FIG. 6a). The material is then successively shaped between the legs of the V so that each new layer closes a little more tightly the opening shaped like a V (FIG. 6b) until it is completely closed and forms the polygonal perforation 2 (FIG. 6c).

The layers constituting the peripheral tubular wall 1a have, locally, a thickness greater than the second thickness so as to constitute the bosses 6.

Finally, the base material is shaped so as to constitute a new layer in the form of a truncated annular comma having on an internal face a plurality of lugs constituted by portions of beams 7 located at the intersection of their so-called vertical sides 7b and oblique sides 7c.

The beams 7 are fully formed after a succession of a third plurality of shaped material layers, the thickness of the beam portions 7 increasing with each new layer until reaching the straight line d, thus creating the bottom wall 1b of the sleeve 1, also taking into account possible grooves 9 for partial recessing of the beams 7.

The invention claimed is:

1. A tubular ventilation sleeve for a turbomachine distributor, in particular for an aircraft, the sleeve having a generally elongated shape along an axis and comprising a tubular wall perforated around this axis, one of the axial ends of the sleeve being open and the other being closed by a bottom wall, wherein it furthermore comprises support beams when the sleeve is made by additive manufacturing, these beams extending inside the sleeve, between the tubular wall and the bottom wall and having a longitudinal cross-section with a generally triangular shape, two sides of which are respectively connected to the tubular wall and to the bottom wall, and the last side of which is free and extends inside the sleeve, perforations in the tubular wall-being provided between the support beams.

2. The sleeve according to claim 1, wherein each beam has, at the level of its side connected to the bottom wall, a greater thickness of material than the rest of the beam.

3. The sleeve according to claim 1, wherein the beams cover substantially the entire internal surface of the bottom wall.

4. The sleeve according to claim 1, wherein the beams are separated into two series which extend respectively on either side of a straight line extending in the bottom wall, each beam having an end partly located at the level of this straight line.

5. The sleeve according to claim 1, wherein the tubular wall-comprises perforations of polygonal shape, for example square or diamond-shaped.

6. The sleeve according to claim 5, wherein the perforations are substantially identical and are positioned so that one of their vertices is oriented on the side of the bottom wall.

7. The sleeve according to claim 6, wherein the bottom wall comprises, outside the sleeve, grooves for partial recessing of the beams.

8. A turbine distributor for an aircraft turbomachine, comprising internal and external platforms connected together by tubular blades in which are mounted sleeves according to claim 1.

9. An aircraft turbomachine comprising a turbine distributor according to claim 8.

10. A method for making a sleeve according to claim 1 comprising the additive manufacturing of said sleeve on a support starting by making the open end and ending with the closed end of the sleeve.

* * * * *